(12) United States Patent
Chase et al.

(10) Patent No.: US 12,498,074 B2
(45) Date of Patent: Dec. 16, 2025

(54) COMPOSITE FLUID TRANSFER CONDUIT

(71) Applicant: Crompton Technology Group Ltd., West Midlands (GB)

(72) Inventors: Ian Thomas Chase, Berkeley (GB); Alexander Douglas Taylor, Southam (GB); Mathias Lucas Vahe Gabrielli, Banbury (GB)

(73) Assignee: CROMPTON TECHNOLOGY GROUP, LTD., Solihull (GB)

( * ) Notice: Subject to any disclaimer, the term of this patent is extended or adjusted under 35 U.S.C. 154(b) by 0 days.

(21) Appl. No.: 18/185,687

(22) Filed: Mar. 17, 2023

(65) Prior Publication Data

US 2023/0313935 A1 Oct. 5, 2023

(30) Foreign Application Priority Data

Mar. 29, 2022 (EP) ...................................... 22305392

(51) Int. Cl.
*F16L 57/02* (2006.01)
*F16L 9/147* (2006.01)
*F16L 27/12* (2006.01)

(52) U.S. Cl.
CPC ................ *F16L 57/02* (2013.01); *F16L 9/147* (2013.01); *F16L 27/125* (2013.01)

(58) Field of Classification Search
CPC .......... F16L 27/125; F16L 47/18; F16L 57/02
See application file for complete search history.

(56) References Cited

U.S. PATENT DOCUMENTS

| 424,951 | A | * | 4/1890 | Bayles | .................... F16L 47/02 |
|---|---|---|---|---|---|
| | | | | | 285/285.1 |
| 3,417,672 | A | * | 12/1968 | Sampson | .............. B23B 31/302 |
| | | | | | 92/106 |
| 3,667,785 | A | * | 6/1972 | Kapeker | .................. F16L 49/02 |
| | | | | | 285/911 |

(Continued)

FOREIGN PATENT DOCUMENTS

| CA | 3011452 A1 * | 1/2019 | .............. F16L 25/01 |
|---|---|---|---|
| CN | 101210638 A | 7/2008 | |

(Continued)

OTHER PUBLICATIONS

European Search Report for Application No. 22305392.7, mailed Aug. 12, 2022, 11 pages.

(Continued)

*Primary Examiner* — Zachary T Dragicevich
*Assistant Examiner* — James A Linford
(74) *Attorney, Agent, or Firm* — CANTOR COLBURN LLP

(57) ABSTRACT

A composite fluid transfer conduit. The conduit includes a first end portion, a second end portion and a main body portion between the first and second end portions. At least one of the first and second end portions is an end portion comprising a circumferential groove in a radially outer surface of the fluid transfer conduit, an axial end face, and a transition surface between the axial end face and the circumferential groove. The transition surface is configured such that, for any angle of impact of the end portion with a planar impact surface, a resultant impact force on the end portion is directed away from the circumferential groove.

9 Claims, 10 Drawing Sheets

(56) References Cited

U.S. PATENT DOCUMENTS

| | | | | |
|---|---|---|---|---|
| 4,066,281 | A | * | 1/1978 | De Bonis .............. F01M 11/04 |
| | | | | 29/888.011 |
| 10,830,380 | B2 | | 11/2020 | Pollitt et al. |
| 10,948,380 | B2 | | 3/2021 | Faulkner |
| 2016/0258561 | A1 | | 9/2016 | Hiroi |
| 2019/0017633 | A1 | | 1/2019 | Pollitt et al. |

FOREIGN PATENT DOCUMENTS

| | | | | | |
|---|---|---|---|---|---|
| CN | 109027491 | A | | 12/2018 | |
| DE | 2217488 | A1 | | 10/1973 | |
| DE | 4341034 | A1 | * | 6/1995 | ............. B60R 16/08 |
| DE | 202019103665 | U1 | * | 8/2019 | |
| GB | 2373829 | A | * | 10/2002 | ........... F16D 25/123 |
| GB | 2503938 | A | * | 1/2014 | ........... B29C 65/483 |

OTHER PUBLICATIONS

Machine Translation for CN109027491 (A), Published: Dec. 18, 2018, 8 pages.
Machine Translation for DE2217488 (A1), Published: Oct. 31, 1973, 4 pages.
Machine Translation of CN101210638 (A), Published: Jul. 2, 2008, 16 pages.
Tempelman, E., et al. "Experimental and Analytical Study of Free-Fall Drop Impact Testing of Portable Products". Experimental Mechanics (2012) 52:1385-1395.

* cited by examiner

COMPOSITE FLUID TRANSFER CONDUIT

CROSS-REFERENCE TO RELATED APPLICATIONS

This application claims priority to European Patent Application No. 22305392.7 filed Mar. 29, 2022, the entire contents of which is incorporated herein by reference.

TECHNICAL FIELD

The present disclosure relates to composite fluid transfer conduits. In particular, but not exclusively, the present disclosure relates to fibre reinforced polymer fluid transfer conduits for aircraft fuel pipes.

BACKGROUND

Fluid transfer conduits, such as aircraft fuel pipes, are manufactured conventionally from metal. However, fluid transfer conduits are increasingly being manufactured from composite materials such as fibre reinforced polymer (FRP). In aerospace applications (amongst many others), it can be beneficial to utilise these composite conduits wherever possible, in place of metal alternatives, for example for their resistivity and corrosion resistance.

Aircraft fuel pipes manufactured from composite materials can be made more cost effective by forming the seal geometry from composite material instead of using a metallic end to carry the seal groove. However, this design leaves thin, vulnerable geometry exposed at the outer ends of the pipe that may be damaged from impact or drops. The composite seal groove may be particularly vulnerable to impacts onto hard surfaces, particularly at high impact angles. This can lead to a bent seal groove in the case of a metallic geometry, and the formation of cracks in the case of fully composite fuel pipes. Such cracks can compromise the structural integrity and operational integrity of the fuel pipe and can occur from relatively low drop heights (of the order 100-400 mm).

SUMMARY

According to a first aspect of the present disclosure, there is provided a composite fluid transfer conduit comprising of a first end portion, a second end portion and a main body portion between the first and second end portions; wherein at least one of the first and second end portions is an end portion comprising a circumferential groove in a radially outer surface of the fluid transfer conduit, an axial end face, and a transition surface between the axial end face and the circumferential groove; and wherein the transition surface is configured such that, for any angle of impact of the end portion with a planar impact surface, a resultant impact force on the end portion is directed away from the circumferential groove.

Optionally, the transition surface is configured such that, for any angle of impact of the end portion with the planar impact surface, the resultant impact force is directed radially inwards of the circumferential groove.

Optionally, the transition surface comprises a tapered surface. The tapered surface may extend radially outwards from the axial end face towards the circumferential groove.

Optionally, the tapered surface extends from the axial end face at an angle of from 5 degrees to 45 degrees with respect to a plane of the axial end face. For example, the angle may be from 5 degrees to 35 degrees, from 5 degrees to 20 degrees, from 5 degrees to 15 degrees, for example 10 degrees, or from 10 degrees to 20 degrees, for example 16 degrees.

Optionally, the transition surface comprises a convex curved surface. The convex curved surface may extend from the axial end face towards the circumferential groove.

Optionally, the convex curved surface has a radius of curvature of from 1 mm to 10 mm.

In some example, the transition surface may include a tapered surface and a convex curved surface. The tapered surface may be adjacent to the axial end face, and the convex curved surface may be adjacent to the circumferential groove.

Optionally, the end portion further comprises a cylindrical surface or tapered surface between the transition surface and the circumferential groove.

Optionally, the end portion further comprises an impact indicator configured to provide a visual indication of impact to the end portion.

Optionally, the impact indicator comprises at least one raised rib provided on the transition surface.

Optionally, the at least one raised rib extends circumferentially around the transition surface.

Optionally, the at least one raised rib is provided closer to the axial end face than the circumferential groove.

Optionally, the at least one raised rib is configured to dent upon impact.

Optionally, the at least one raised rib comprises a protruding edge configured to dent upon impact.

Optionally, the circumferential groove is configured for receiving an annular seal.

According to a second aspect of the present disclosure, there is provided a composite fluid transfer conduit assembly comprising the composite fluid transfer conduit according the first aspect of the disclosure, and further comprising of an annular seal seated in the circumferential groove; and a socket positioned over the end portion such that the annular seal forms a sealing engagement with a radially inner surface of the socket.

It will be appreciated that any of the features described above in relation to the first aspect of the present disclosure may be equally applied to the second aspect of the present disclosure.

Examples described herein advantageously provide fully composite conduits capable of withstanding impact forces from dropping at greater heights than previously known composite conduits.

Examples described herein advantageously direct impact forces away from the circumferential groove. In this way, the seal seat around the circumferential groove is capable of withstanding significant impact forces that may cause damage or cracks rendering the conduit unsuitable for use.

DETAILED DESCRIPTION

Examples of this disclosure will now be described with reference to the accompanying drawings, in which.

In the drawings like reference numerals refer to like parts.

DETAILED DESCRIPTION

Figure 1:
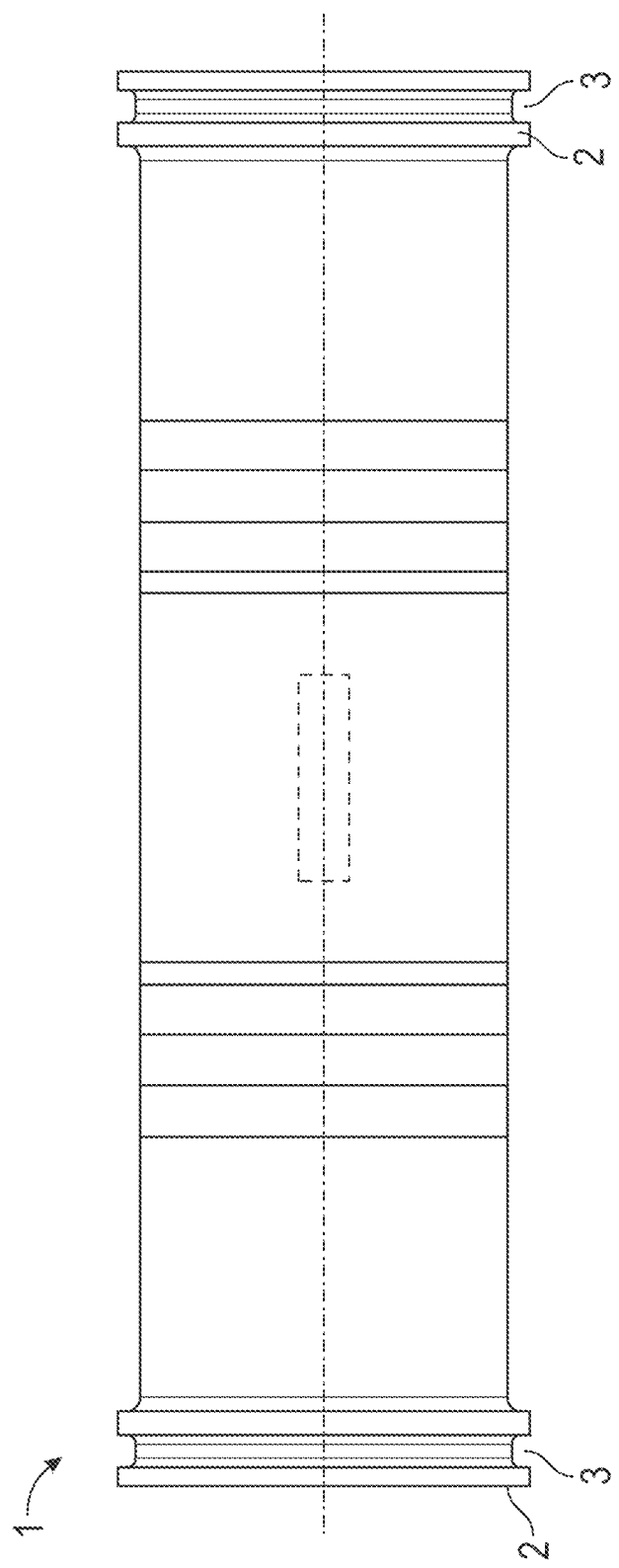
FIG. 1 shows a side view of a fluid transfer conduit according to the prior art.

FIG. 1 shows a fluid transfer conduit 1 in the form of a fuel pipe according to the prior art. The conduit 1 is a cylinder of circular cross-section and is formed from a composite material comprising glass fibres embedded in a resin matrix.

At each axial end of the conduit 1 is a cylindrical seal seat 2 with an O-ring groove 3 formed therein. The seal seat 2 extends radially outwardly from the outer surface of the conduit 1 and the O-ring groove 3 is a circumferential groove extending fully around the conduit 1.

Figure 2:
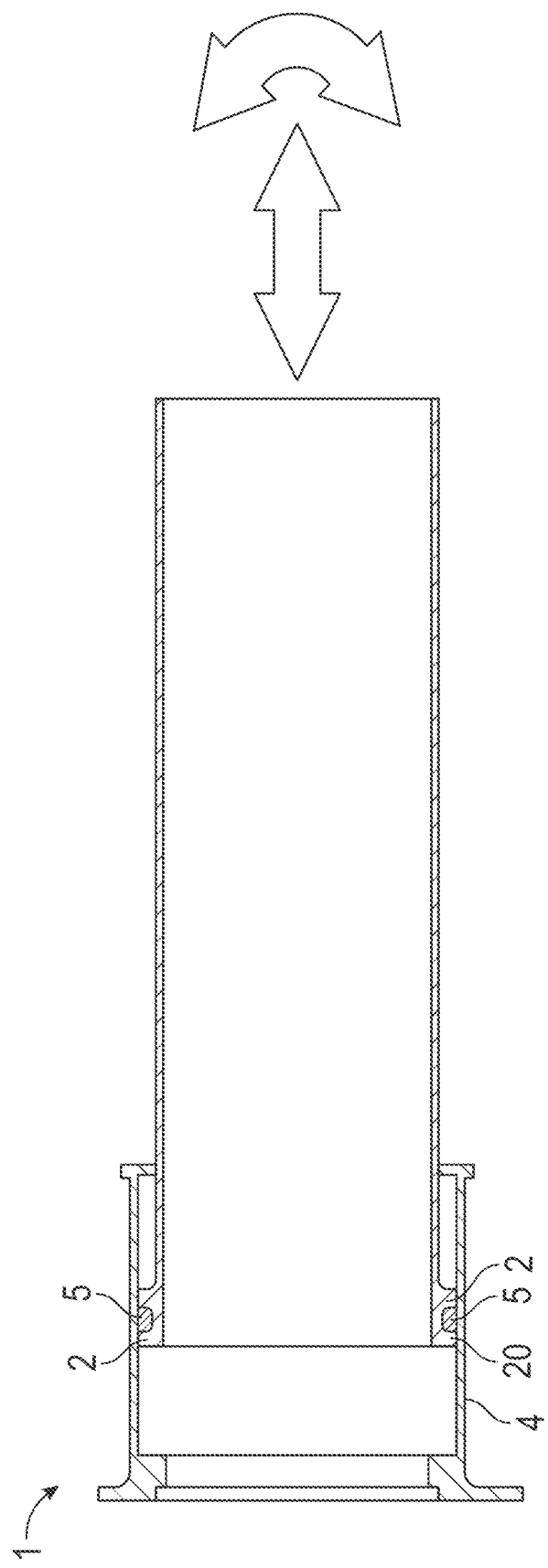
FIG. 2 shows a cross-section of a fluid connection between a fluid transfer conduit and a socket according to the prior art.

In use, the conduit 1 is inserted into a metal socket 4 as shown in FIG. 2 and an O-ring 5 is seated in the groove 3 (i.e. on the outer surface of the conduit 1) for sealing against the inside surface of the socket 4. This arrangement provides a fluid seal between the two parts while allowing some movement (axial movement of the conduit 1 relative to the socket 4 as well as rotational movement of the conduit 1 relative to the socket 4) which is useful in aircraft wing installations where a certain degree of wing flex needs to be accommodated for example.

The seal seat 2 is formed by winding fibres around the base cylinder (i.e. the electrically conductive part) of the conduit 1. The seal seat 2 is thus formed from hoop wound fibres and is built up to a large enough height that the groove 3 can be formed therein. The seal seat 2 may be formed as part of the same winding process as the main cylinder, or it may be wound as a separate process. The seal seat 2 and the base cylinder may be cured together in the same curing process or the base cylinder may be cured first with the seal seat 2 wound onto the cured base cylinder and then separately cured in a subsequent process.

The seal groove 2 of the conduit 1 can be vulnerable to damage through accidental dropping during installation of the conduit 1. In a metallic conduit, this may result in slight bending of the seal seat 2, but in a composite conduit cracks can occur in the seal seat 2 around the seal groove 3, and this can render the conduit unsuitable for use.

The present inventors have found that a dropping force on the seal seat 2, and therefore resultant damage to the seal seat 2, changes according to the drop angle of the conduit 2.

Figure 3:
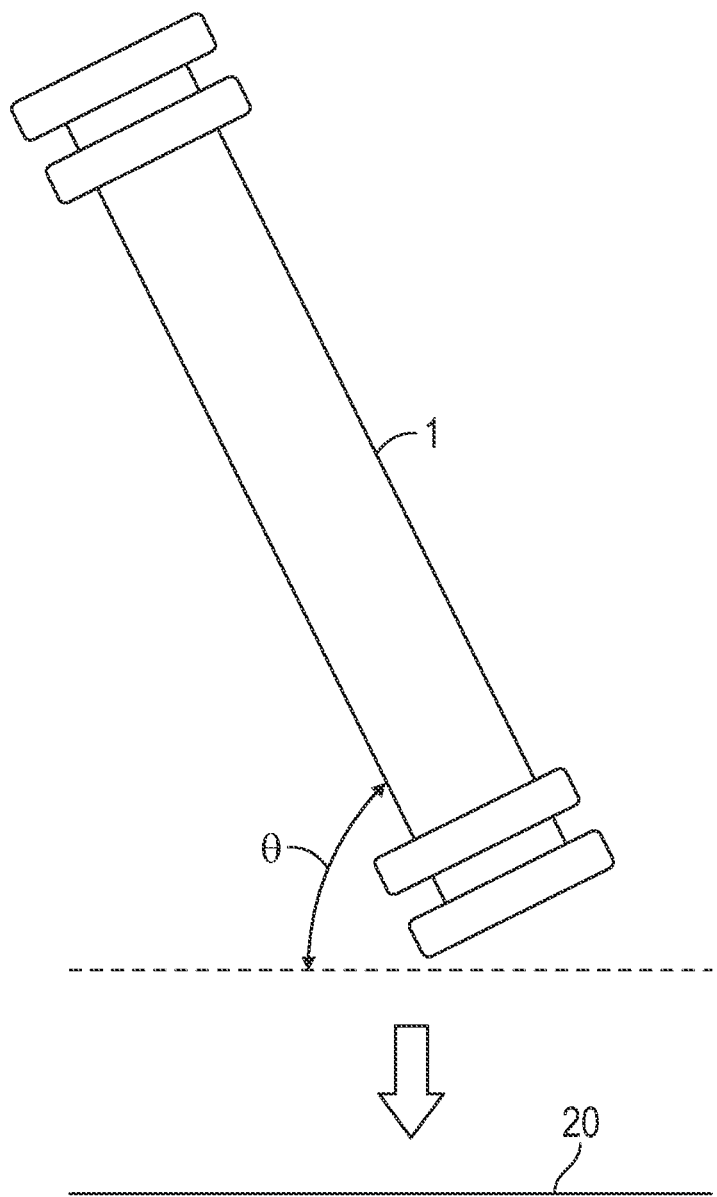
FIG. 3 illustrates the drop angle for a conduit against a planar impact surface.

As used herein, the term "drop angle" refers to the angle at which a conduit impacts a surface when dropped from a height. In other words, with reference to FIG. 3, the drop angle is the angle θ between the central longitudinal axis of the conduit 1 and the impact surface 20. A drop angle of 90 degrees corresponds to the conduit 1 impacting a surface with the central longitudinal axis of the conduit at 90 degrees to the impact surface 20. In this example, the conduit 1 may be substantially vertical on impact. A drop angle of 0 degrees corresponds to the conduit 1 impacting a surface with the central longitudinal axis of the conduit 1 parallel to the impact surface 20. In this example the conduit 1 may be substantially horizontal on impact.

Figure 4:
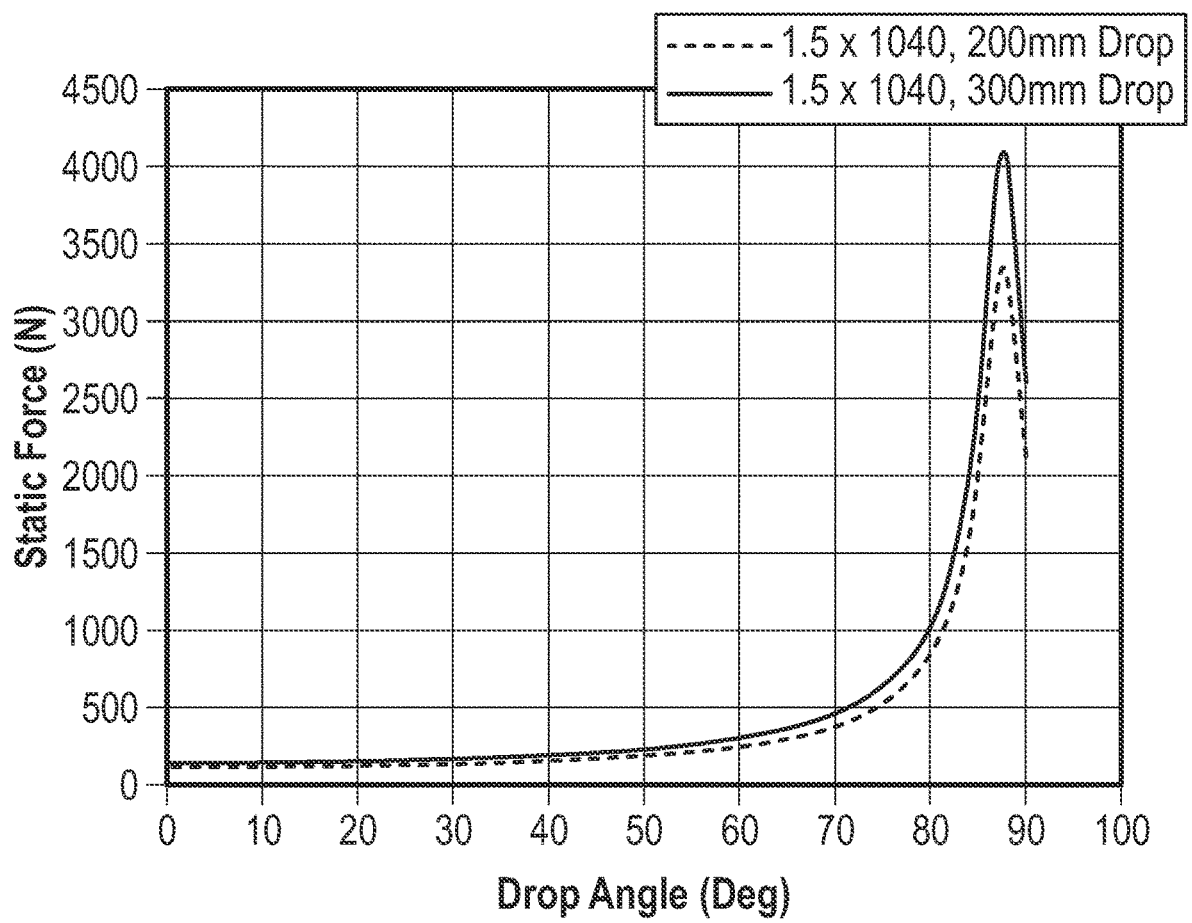
FIG. 4 illustrates the equivalent static force on a conduit for drop angles between 0 and 90 degrees at two different drop heights.

FIG. 4 illustrates the equivalent static force for drop angles from 0 to 90 degrees with conduits of 1.5 inch (38.1 mm) diameter and 1040 mm length when dropped from a height of 200 mm and 300 mm. The equivalent static forces are calculated according to the methodology set out in Tempelman, E., Dwaikat, M.M.S. & Spitás, C. Experimental and Analytical Study of Free-Fall Drop Impact Testing of Portable Products. Exp Mech 52, 1385-1395 (2012). As shown in FIG. 4, the equivalent static force increases significantly from a drop angle of around 70 degrees, and peaks at a drop angle of around 88 degrees, where the conduit centre of gravity is directly above the impact point. However, for lower drop angles below around 70 degrees, the equivalent static force is less significant and therefore less likely to cause significant damage to the seal seat 2. It will be appreciated that the angle of the peak equivalent static force will vary according to the conduit geometry, including the diameter and length of the conduit.

The present disclosure aims to reduce the equivalent static force in the seal seat region, particularly for higher drop angles, for example drop angles above 70 degrees, where the equivalent static force is greatest.

Figure 5:
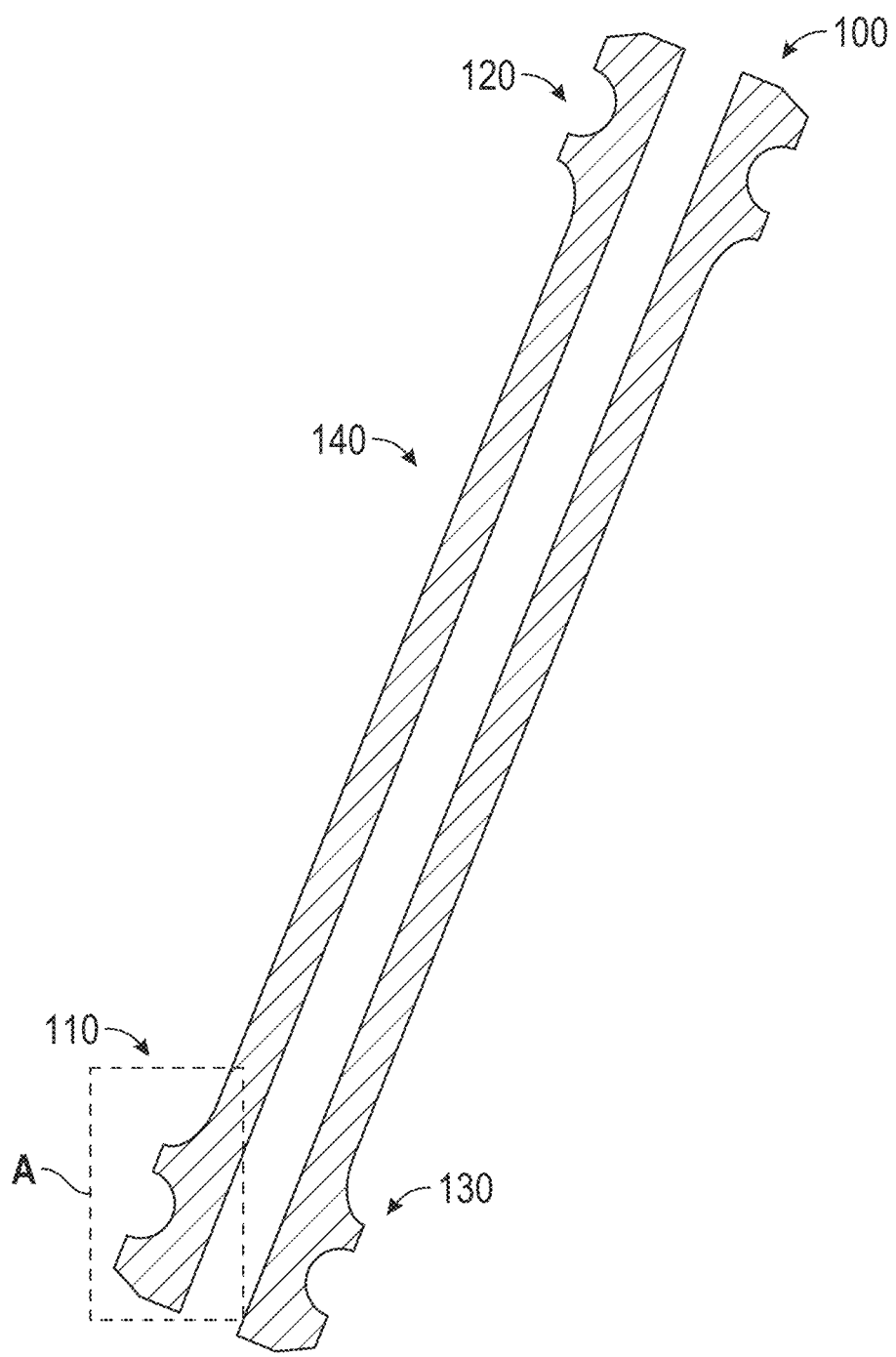
FIG. 5 illustrates a sectional view of a conduit according to a first example of the disclosure.

FIG. 5 illustrates a section view of a conduit 100 according to a first example of the present disclosure. The conduit 100 is a composite fluid transfer conduit. For example, the conduit 100 may be a fibre reinforced polymer composite conduit. The conduit 100 may be formed similarly to the conduit 1 described above with reference to FIG. 1. The conduit 100 may aptly be configured as an aircraft fuel pipe.

The conduit 100 includes a first end portion 120, a second end portion 130, and a main body portion 140 between the first end portion 120 and the second end portion 130. At least one of the first and second end portions 120, 130 is an end portion 110 including a circumferential groove 102. A section, A, of the end portion 110 is illustrated in further detail in FIG. 6.

The circumferential groove 102 is provided in a radially outer surface of the conduit 100. The end portion 110 further includes an axial end face 104 and a transition surface 106 between the axial end face 104 and the circumferential groove 102. The transition surface 106 is configured such that, for any angle of impact of the end portion 110 with a planar impact surface 20, a resultant impact force on the end portion 110 is directed away from the circumferential groove 102.

In this example, the circumferential groove 102 is configured for receiving an annular seal. That is, the circumferential groove 102 is sized and shaped to receive an annular seal, for example an O-ring seal. In this example, the circumferential groove 102 is provided within a seal seat 108a, 108b. The seal seat 108a, 108b extends radially outwardly from a tubular body 112 of the conduit 100. The circumferential groove 102 is cut into a radially outer surface of the seal seat 108a, 108b, thereby forming an outer seal seat 108a and an inner seal seat 108b.

The axial end face 104 is a substantially planar annular surface defining the axial end of the conduit 100. In this example, the transition surface 106 extends from the axial end face 104 to form part of the outer seal seat 108a.

As mentioned above, the transition surface 106 is configured such that, for any angle of impact of the end portion 110 with a planar impact surface 20, a resultant impact force on the end portion 110 is directed away from the circumferential groove 102. In this way, impact forces on the end portion 110 may be directed around the circumferential groove 102, such that they do not pass through the circumferential groove 102. This can help to reduce the bending moment in the region of the circumferential groove 102 and hence the maximum drop height of the conduit before which damage occurs is increased.

For example, the transition surface 106 may be configured such that, for any angle of impact of the end portion 110 with the planar impact surface 20, the resultant impact force is directed radially inwards of the circumferential groove 102, for example into a tubular body 112 of the conduit 110.

Figure 6:
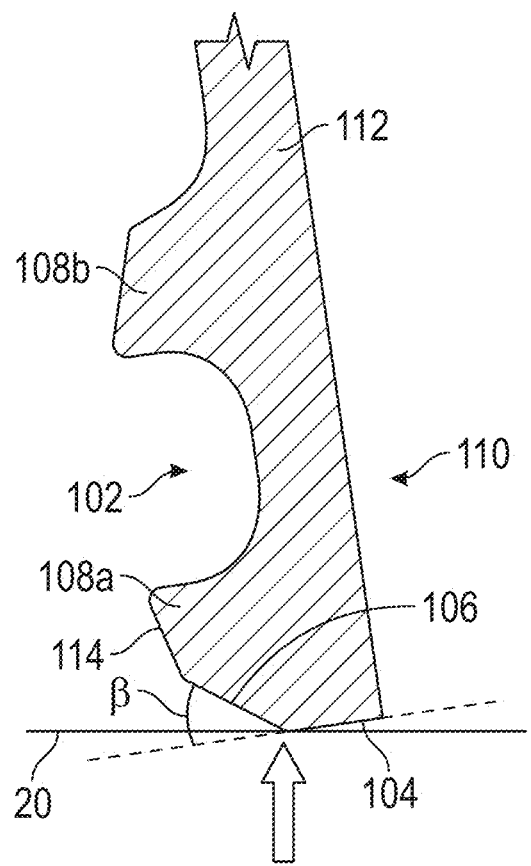
FIG. 6 illustrates the section A of FIG. 5.

In example shown in FIG. 6, the transition surface 106 is a tapered surface extending from the axial end face 104 towards the circumferential groove 102. The transition surface 106 may be configured to taper radially outwardly away from the axial end face 104 towards the circumferential groove 102.

For example, the tapered transition surface 106 may extend from the axial end face 104 at an angle β of from 5 degrees to 45 degrees with respect to a plane of the axial end face 104. For example, the angle β may be from 5 degrees to 35 degrees, from 5 degrees to 20 degrees, from 5 degrees to 15 degrees, for example 10 degrees, or from 10 degrees to 20 degrees, for example 16 degrees.

The end portion 110 may further include a substantially cylindrical or tapered surface 114 between the transition surface 106 and the circumferential groove 102. In this example, the end portion 110 includes a tapered surface 114 between the transition surface 106 and the circumferential groove 102. The tapered surface 114 is configured to extend radially outwardly from the transition surface 106 towards the circumferential groove 102. For example, the tapered surface 114 may extend radially outwardly at an angle of from 5 to 25 degrees, or from 10 to 20 degrees, for example 15 degrees, with respect to the axial direction of the conduit 100. The tapered surface 114 may be beneficial for ease of installation of the conduit 100 with a socket and to provide a degree of articulation in the socket. The tapered surface 114 may also help to direct impact forces radially inwards of the circumferential groove 102 for lower drop angles.

Figure 7:
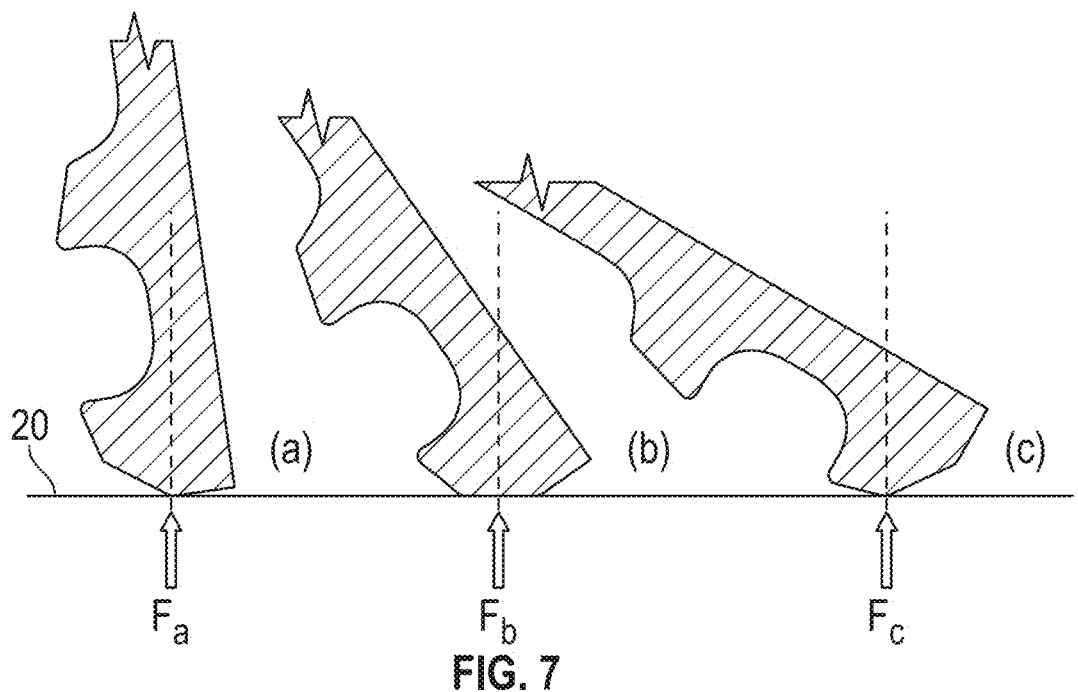
FIG. 7 illustrates the impact forces at different drop angles for the example of FIG. 6.

FIG. 7 illustrates the direction and magnitude of impact forces Fa-c for different drop angles of the conduit 100 of FIGS. 5 and 6. In example (a) the drop angle θ is near vertical. That is, the drop angle θ is about 85 degrees. In example (b), the drop angle θ is about 45 degrees. In example (c), the drop angle θ is about 30 degrees. As illustrated, the magnitude of the impact force is greatest in example (a) with the largest drop angle and is smallest in example (c) with the smallest drop angle.

As illustrated by the dashed lines, in each example the impact force Fa-c is directed away from the circumferential groove 102. That is, the impact force Fa-c does not pass through the circumferential groove 102. Instead, the impact force Fa-c is directed radially inward of the circumferential groove 102 into the tubular body 112 of the conduit 100.

In example (a), a first impact point of the end portion 110 of the conduit 100 with the impact surface 20 is at an edge between the transition surface 106 and the axial end face 104. The impact force Fa is thereby directed into the tubular body 112 of the conduit 100 and direct impact forces on the outer seal seat 108a are avoided. This is particularly beneficial for high drop angles, for which the magnitude of the impact force is greater.

In example (b), a first impact point of the end portion 110 of the conduit 100 with the impact surface 20 is on the transition surface 106. The impact force Fb is therefore distributed across the transition surface 106. Due to the tapered geometry of the transition surface 106, the impact force Fb is directed through a portion of the outer seal seat 108a that is supported by the tubular body 112 of the conduit 100. That is, the impact force Fb is directed from the transition surface 106 into the tubular body 112, without passing through the circumferential groove 102.

In example (c), a first impact point of the end portion 110 of the conduit 100 with the impact surface 20 is at an edge between the transition surface 106 and the cylindrical or tapered surface 114. The impact force Fc is therefore directed through a portion of the outer seal seat 108a that is supported by the tubular body 112 of the conduit 100. That is, the impact force Fc is directed through the outer seal seat 108a directly to the tubular body 112, without passing through the circumferential groove 102.

In each of the examples (a)-(c), the impact forces Fa-c are directed only along areas of the outer seal seat 108a that are supported by the tubular body 112 in the direction of the impact force, or the impact force is directed straight into the tubular body 112 in the case of example (a). In examples (b) and (c) the impact force passes through the outer seal seat 108a and is absorbed by the tubular body supporting the outer seal seat 108a. Directing the impact forces in this way can help to reduce risk of cracking of the outer seal seat 108a upon impact from dropping, since the impact force is largely absorbed by the tubular body 112 rather than the seal seat 108. It will be appreciated by those skilled in the art that this will apply for any drop angle against a planar impact surface 20, and is not limited to the example drop angles illustrated in FIG. 7.

Figure 8:
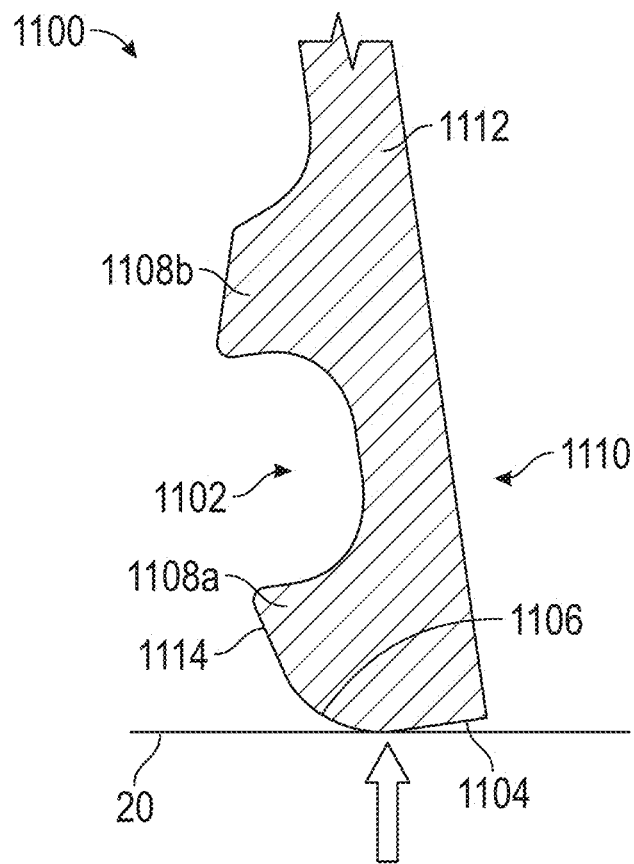
FIG. 8 illustrates another example of the section A of FIG. 5.

FIG. 8 illustrates a section of another example end portion 110 according to the present disclosure. In this example, many of the features are the same as those described in relation to FIG. 6, and will not be described again in detail. However, in this example, the transition surface 106 includes a convex curved surface extending from the axial end face 104 towards the circumferential groove 102.

The convex curved surface is configured such that, for any angle of impact of the transition surface 106 with a planar impact surface 20, the resultant impact force is directed away from the circumferential groove 102. For example, the convex curved surface may be configured to direct impact forces through the outer seal seat 108a directly into the tubular body 112, without passing through the circumferential groove 102.

The transition surface 106 in this example may be configured with a constant radius of curvature, or alternatively the radius of curvature of the transition surface may be non-constant depending on the geometry of the other components of the conduit 100. For example, the transition surface 106 may be configured with a radius of curvature of from 1 mm to 10 mm, or from 1 mm to 5 mm, for example 2 mm. For a non-constant radius of curvature, the radius of curvature of the transition surface 106 may be smallest at the interface with the axial end face 104 and may increase towards the circumferential groove 102.

Similar to the example described above in relation to FIG. 6, the end portion 110 may further include a substantially cylindrical or tapered surface 114 between the transition surface 106 and the circumferential groove 102. In this example, the end portion 110 includes a tapered surface 114 between the transition surface 106 and the circumferential groove 102. The tapered surface 114 is configured to extend radially outwardly from the transition surface 106 towards the circumferential groove 102. For example, the tapered surface 114 may extend radially outwardly at an angle of from 5 to 25 degrees, or from 10 to 20 degrees, for example 15 degrees with respect to the axial direction of the conduit 100.

FIG. 8 illustrates the direction and magnitude of impact forces Fd-f for different drop angles of the conduit 100 of FIG. 8. In example (d) the drop angle θ is near vertical. That is, the drop angle θ is about 85 degrees. In example (e), the drop angle θ is about 45 degrees. In example (f), the drop angle θ is about 30 degrees. As illustrated, the magnitude of the impact force is greatest in example (d) with the largest drop angle and is smallest in example (f) with the smallest drop angle.

As illustrated by the dashed lines, in each example the impact force Fd-f is directed away from the circumferential groove 102. That is, the impact force Fd-f does not pass through the circumferential groove 102. Instead, the impact force Fd-f is directed radially inward of the circumferential groove 102 into the tubular body 112 of the conduit 100.

In example (d), a first impact point of the end portion 110 of the conduit 100 with the impact surface 20 is on the transition surface 106 close to the axial end face 104. The impact force Fa is thereby directed through a small section of the outer seal seat 108a and along the tubular body 112 radially inwards of the circumferential groove 102. Thus direct impact forces on the outer seal seat 108a are significantly reduced. This is particularly beneficial for high drop angles, for which the magnitude of the impact force is greater.

In example (e), a first impact point of the end portion 110 of the conduit 100 with the impact surface 20 is at a central region of the transition surface 106. The impact force Fe is directed from the contact point with the transition surface 106 and through a portion of the outer seal seat 108a that is supported by the tubular body 112 of the conduit 100. That is, the impact force Fe is directed from the transition surface 106 into the tubular body 112, without passing through the circumferential groove 102.

In example (f), a first impact point of the end portion 110 of the conduit 100 with the impact surface 20 is on a portion of the transition surface 106 close to the cylindrical or tapered surface 114. The impact force Ff is therefore directed through a portion of the outer seal seat 108a that is supported by the tubular body 112 of the conduit 100. That is, the impact force Ff is directed through the outer seal seat directly to the tubular body 112, without passing through the circumferential groove 102.

Figure 9:
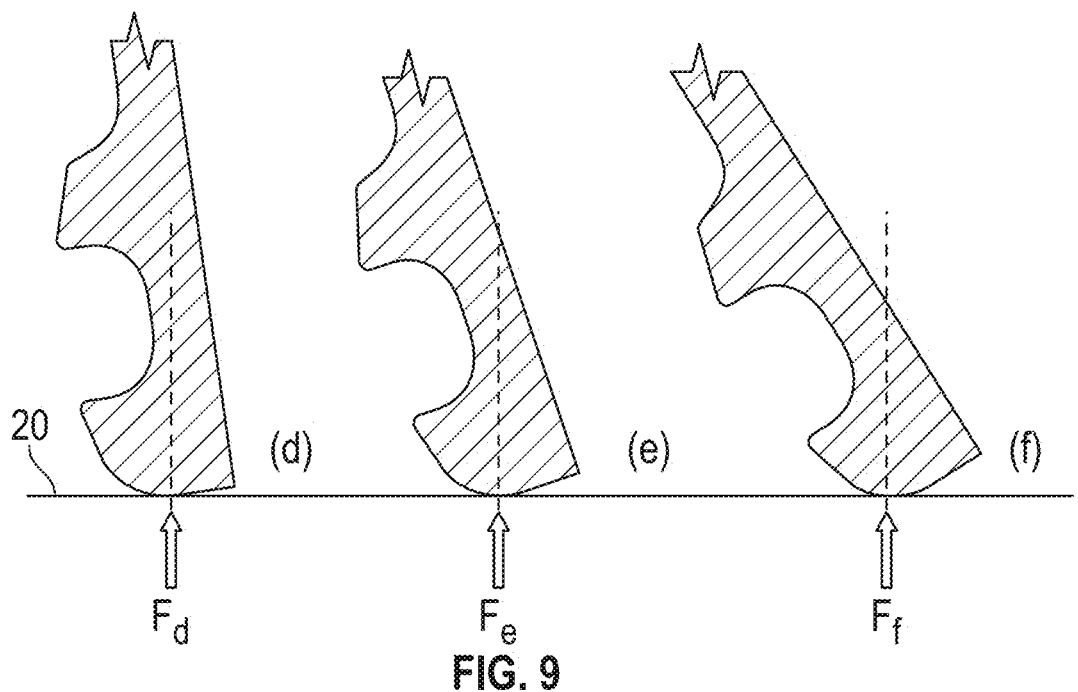
FIG. 9 illustrates the impact forces at different drop angles for the example of FIG. 8.

In each of the examples (d)-(f), the impact forces Fd-f are directed only along areas of the outer seal seat 108a that are supported by the tubular body 112 in the direction of the impact force. The curved transition surface provides a continuous spectrum of first impact points available depending on the drop angle of the conduit. For any impact of the curved transition surface 106 with a planar impact surface 20, the impact force passes through the outer seal seat 108a and is absorbed by the tubular body supporting the outer seal seat 108a. Directing the impact forces in this way can help to reduce risk of cracking of the outer seal seat 108a upon impact from dropping, since the impact force is largely absorbed by the tubular body 112 rather than the seal seat 108. It will be appreciated by those skilled in the art that this will apply for any drop angle against a planar impact surface, and is not limited to the example drop angles illustrated in FIG. 9.

The example conduits shown in FIGS. 5 to 9 may further include means for providing visual indication of impact damage to the end portion 110 of the conduit 100. That is, the conduit may further include an impact indicator that provides a visual indication of whether the conduit has been dropped onto the end portion 110.

Figure 10:
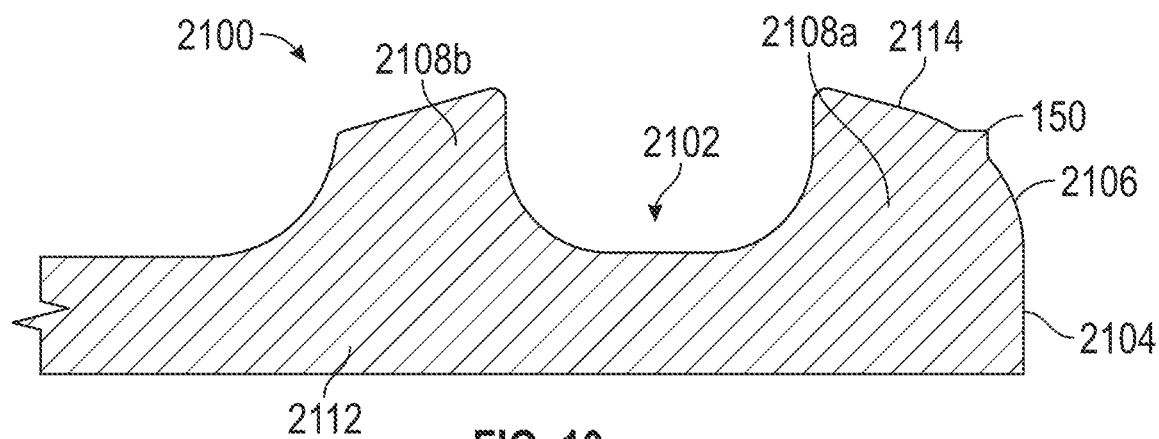
FIG. 10 illustrates an example end portion including an impact indicator.

FIG. 10 illustrates an example section of an end portion 110 including an impact indicator 150. Whilst this example is shown with a curved transition surface 106, it will be appreciated that the impact indicator 150 may be equally applied to other examples in which the transition surface 106 is tapered or has any other suitable form. The impact indicator 150 is configured to provide a visual indication of impact to the end portion.

For example, the impact indicator 150 may be sized and positioned such that upon impact of the end portion 110 with a planar impact surface 20, the impact indicator is configured to deform, dent, crack, or break to provide a visible indication of non-structural damage to the end portion 110 that occurs before any damage that leads to performance being compromised.

For example, the impact indicator 150 may include at least one raised rib provided on the transition surface 106. The at least one raised rib may be provided on a portion of the transition surface 106 corresponding to first impact points that give rise to the greatest impact forces. That is, the at least one raised rib 150 may be provided closer to the axial end face 104 than the circumferential groove 102.

For example, the at least one rib may be provided in a region of the transition surface that corresponds to first impact points for drop angles of from 75 to 90 degrees, or from 80 to 85 degrees. In this way, the impact indicator 150 will visually indicate when the end portion 110 has been subjected to larger impact forces from near vertical drop angles.

The at least one raised rib 150 is aptly configured to extend circumferentially around the transition surface 106. In this way, the raised rib 150 will function to provide visual indication of impact regardless of the circumferential orientation of the conduit 100 upon impact with the planar impact surface 20.

In this example a single raised rib is provided 150. However, it will be appreciated that two or more raised ribs 150 may be provided on the transition surface 106. Aptly, each raised rib 150 is configured to extend circumferentially and is spaced apart from adjacent ribs.

Figure 11A:
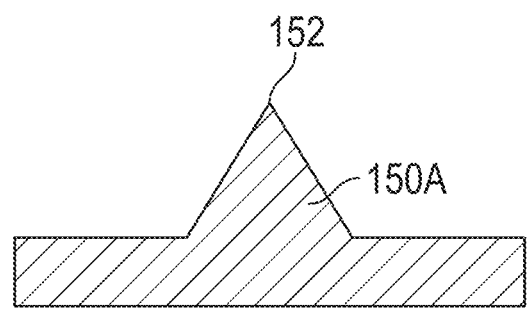
FIGS. 11a to 11c illustrate example cross-sections of an impact indicator.
Figure 11B:
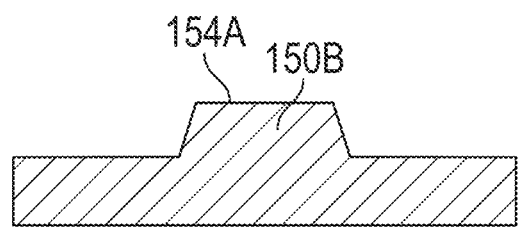
Figure 11C:
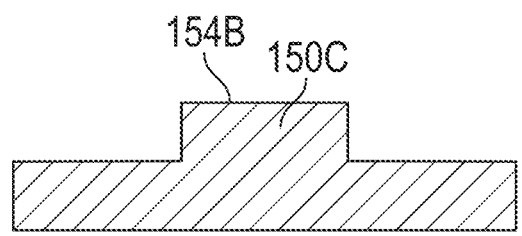

FIGS. 11a to 11c illustrate example cross-sections of the circumferential rib 150. In the example of FIG. 11a the circumferential rib 150 is configured with a triangular cross-section. This cross-section includes a protruding edge 152, which is more likely to visually deform or crack upon impact than the transition surface 106, thereby providing a clear indication of possible damage.

In this example, the circumferential rib 150 protrudes by about 0.45 mm. The angle between a first side portion and a second side portion of the rib is about 110 degrees.

In the example of FIG. 11b, the circumferential rib 150 is configured with a trapezoid cross-section. This cross-section includes a protruding surface 154, which is more likely to visually deform or crack upon impact than the transition surface 106, thereby providing a clear indication of possible damage.

In this example, the circumferential rib 150 protrudes by about 0.3 mm. The angle between a first side portion and a second side portion of the rib is about 110 degrees. A width of the protruding surface is about 0.3 mm.

In the example of FIG. 11c, the circumferential rib 150 is configured with a rectangular cross-section. This cross-section includes a protruding surface 154, which is more likely to visually deform or crack upon impact than the transition surface 106, thereby providing a clear indication of possible damage.

In this example, the circumferential rib 150 protrudes by about 0.3 mm. A width of the protruding surface is about 0.8 mm.

It will be appreciated that the circumferential rib 150 may be sized differently depending on the size of the conduit 100. For example, the circumferential rib 150 may protrude from the transition surface 106 with a height of from 0.1 mm to 0.5 mm. Similarly, the angle between the first side portion and the second side portion in the examples shown in FIGS. 11a and 11b may be from 70 degrees to 120 degrees.

The end portion 110 of the conduit 100 may be formed by winding fibres around the tubular body 112 of the conduit 100. The seal seat 8a, 8b is thus formed from the wound fibres and is built up to a large enough height that the circumferential groove 102 can be formed therein. The seal seat 8a, 8b may be formed as part of the same winding process as the tubular body 112, or it may be wound as a separate process. The seal seat 8a, 8b and the tubular body 112 may be cured together in the same curing process or the tubular body 112 may be cured first with the seal seat 8a, 8b wound onto the cured tubular body 112 and then separately cured in a subsequent process.

The circumferential groove 102, and transition surface 106 are then machined into the seal seat 8a, 8b by cutting away excess material.

Figure 12:
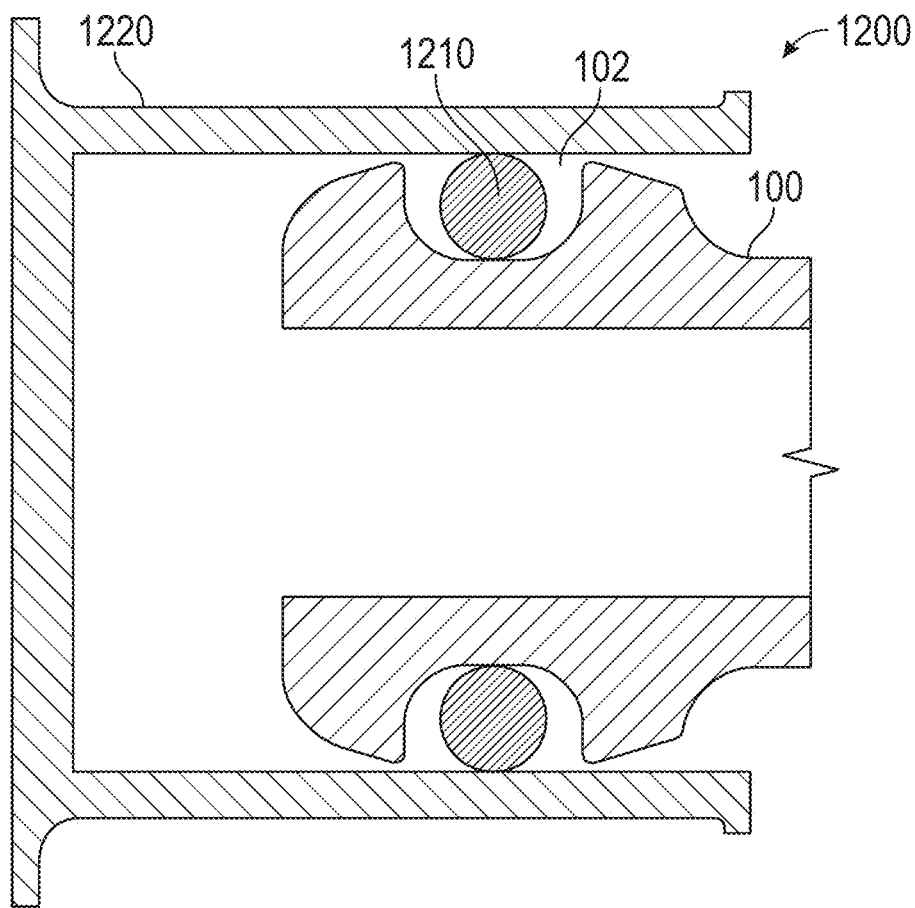
FIG. 12 illustrates a conduit assembly including a conduit and a socket.

FIG. 12 illustrates a fluid transfer conduit assembly 1200 including the a fluid transfer conduit 100 as described above. The assembly further includes an annular seal 1210 seated in the circumferential groove 102. The annular seal 1210 may be any suitable seal as is known in the art, for example an elastomer O-ring seal.

The assembly further includes a socket 1220 positioned over the end portion such that the annular seal 1210 forms a sealing engagement with a radially inner surface of the socket 1220. The socket 1220 may be configured to allow a degree of articulation of the joint, which may be particularly beneficial in aerospace applications, for example.

The socket 1220 may be a fibre reinforced polymer composite socket, and may be formed of the same materials as the conduit 100. This can help to mitigate problems with galvanic corrosion, which can occur when using metallic components in combination with composite components. Composite sockets may also be advantageous since simpler and more cost effective manufacturing techniques, for example injection moulding, may be more viable and material wastage may be minimised.

Although in the examples described above, the circumferential groove 102 is formed in a seal seat 108a, 108b positioned radially outwards of the tubular body 112 of the conduit, in other examples the circumferential groove 102 may be formed directly into the radially outer surface of the tubular body 112. For example, the tubular body 112 may be formed of sufficient radial thickness to accommodate the circumferential groove 102. The circumferential groove 102 and the transition surface 106 may be formed directly on the tubular body 112. In this way, the end of the tubular body 112 between the axial end 104 of the conduit and the circumferential groove 102 may form the outer seal seat 108a.

Although the examples described above include a tapered or cylindrical surface 114 between the transition surface 106 and the circumferential groove, it will be appreciated that in other examples the tapered or cylindrical surface may be omitted and the transition surface 106 may extend all the way from the axial end face 104 up to the edge of the circumferential groove 102.

Whilst the examples described above include a transition surface having a single tapered surface, in other examples, the transition surface 106 may include two or more tapered surfaces. For example, a first tapered surface may extend from the axial end face at a first angle and a second tapered surface may extend from the first tapered surface at a second angle greater than the first angle. Each additional tapered surface will provide an additional first impact point through which impact forces may be directed dependent on the drop angle of the conduit.

Figure 13:
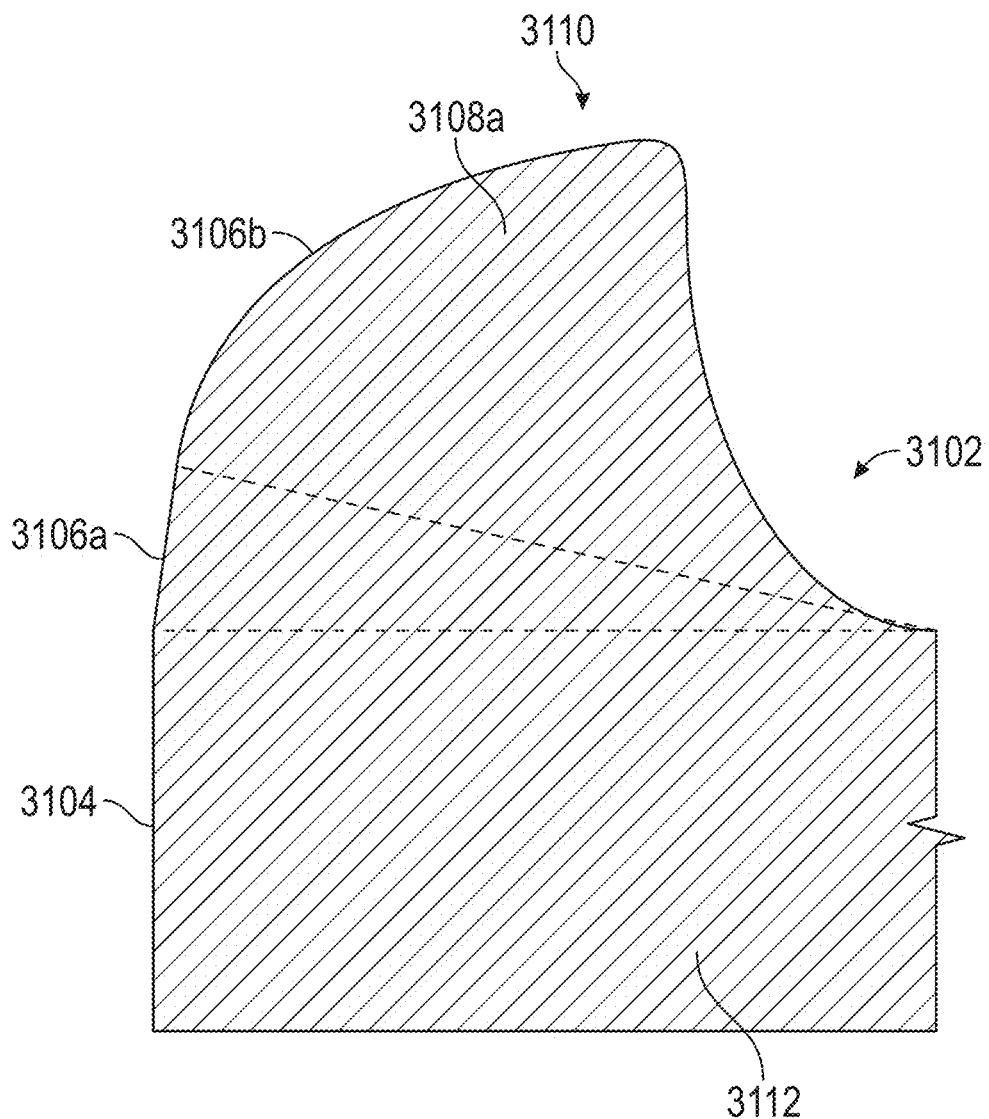
FIG. 13 illustrates another example of an end portion.

FIG. 13 illustrates a further example of an end portion 110a. In this example, the transition surface 106a, 106b includes a tapered portion 106a and a convex curved portion 106b. In this example, the tapered portion 106a extends between the axial end face 104 and the convex curved portion 106b. The convex curved portion 106b extends between the tapered portion 106a and the circumferential groove 102.

In the same way as the examples described above, the transition surface 106a, 106b is configured such that, for any angle of impact of the end portion 110a with a planar impact surface, a resultant impact force on the end portion 110a is directed away from the circumferential groove 102. In this way, impact forces on the end portion 110 may be directed around the circumferential groove 102, such that they do not pass through the circumferential groove 102.

The tapered portion 106a and the convex curved portion 106b may be configured such that, for any angle of impact of the end portion 110a with the planar impact surface 20, the resultant impact force is directed radially inwards of the circumferential groove 102.

The tapered portion 106a may be configured to taper radially outwardly away from the axial end face 104 towards the convex curved portion 106b. For example, the tapered portion 106a may extend from the axial end face 104 at an angle of from 5 degrees to 45 degrees with respect to a plane of the axial end face 104, or from 5 degrees to 20 degrees, or from 5 degrees to 15 degrees, for example 12 degrees with respect to a plane of the axial end face 104.

The convex curved portion 106b may be configured with a constant radius of curvature, or alternatively the radius of curvature may be non-constant. For example, the convex curved portion 106b may be configured with a radius of curvature of from 1 mm to 10 mm, or from 1 mm to 5 mm, for example 2 mm. For a non-constant radius of curvature, the radius of curvature of the convex curved portion 106b may be smallest at the interface with the tapered portion 106a and may increase towards to the circumferential groove 102.

By utilising a tapered portion 106a in combination with a convex curved portion 106b, the axial length of the outer seal seat 108a can be reduced whilst still effectively directing impact forces away from the circumferential groove 102. Reducing the axial length of the outer seal seat 108a may be beneficial to help maintain a degree of articulation of a joint formed when the conduit is coupled with a suitable socket.

As mentioned above, the conduits described herein may be suitable for use as aircraft fuel pipes. Such pipes may vary in size, for example from 0.5 inch to 5 inch diameter and from 160 mm to 1300 mm in length.

Example 1

Table 1 below illustrates the maximum drop height for a conduit configured with standard seal seat geometry such as that shown in FIG. 1 and for a conduit with seal seat geometry such as that shown in FIG. 6 with a transition surface tapered at an angle β of 10 degrees. The maximum drop height is considered to be the maximum height at which the conduit can be dropped without causing significant damage, such as cracking, to the seal seat region.

TABLE 1

|  | 0° | 45° | 85° |
| --- | --- | --- | --- |
| Standard seal seat geometry | >1000 mm | ~400 mm | <100 mm |
| Seal seat with tapered transition portion at 10° angle | >1000 mm | ~400 mm | >1000 mm |

As is clearly shown in Table 1, the maximum drop height for drop angles of 0 degrees and 45 degrees was substantially identical for both conduit designs. However, for a drop angle of 85 degrees, the maximum drop height was approximately 10 times greater for the conduit including the tapered transition surface.

It will be appreciated by those skilled in the art that the disclosure has been illustrated by describing one or more examples thereof, but is not limited to these examples; many variations and modifications are possible, within the scope of the accompanying claims.

The invention claimed is:

1. A composite fluid transfer conduit comprising:
   a first end portion;
   a second end portion; and
   a main body portion between the first and second end portions;
   wherein at least one of the first and second end portions is an end portion comprising:
      a circumferential groove in a radially outer surface of the fluid transfer conduit;
      an axial end face; and
      a transition surface between the axial end face and the circumferential groove;
      wherein the transition surface includes a tapered surface portion and a convex curved portion, wherein the tapered surface portion extends between the axial end face and the convex curved portion and the convex curved portion extends from the tapered surface portion to the circumferential groove, where the transitional surface is configured such that, for any angle of impact of the convex curved portion with a planar impact surface, a resultant impact force on the convex curved portion is directed radially inward of the circumferential groove located at an end where the impact occurred, wherein the tapered surface extends from the axial end face at an angle of from 5 degrees to 45 degrees with respect to a plane of the axial end face and wherein the convex curved surface has a radius of curvature of from 1 mm to 10 mm.

2. A composite fluid transfer conduit according to claim 1, wherein the end portion further comprises an impact indicator configured to provide a visual indication of impact to the end portion.

3. A composite fluid transfer conduit according to claim 2, wherein the impact indicator comprises at least one raised rib provided on the transition surface.

4. A composite fluid transfer conduit according to claim 3, wherein the at least one raised rib extends circumferentially around the transition surface.

5. A composite fluid transfer conduit according to claim 3, wherein the at least one raised rib is provided closer to the axial end face than the circumferential groove.

6. A composite fluid transfer conduit according to claim 3, wherein the at least one raised rib is configured to dent upon impact.

7. A composite fluid transfer conduit according to claim 3, wherein the at least one raised rib comprises a protruding edge configured to dent upon impact.

8. A composite fluid transfer conduit according to claim 3, wherein the circumferential groove is configured for receiving an annular seal.

9. A composite fluid transfer conduit assembly comprising:
   a composite fluid transfer conduit according to claim 1;
   an annular seal seated in the circumferential groove; and
   a socket positioned over the end portion such that the annular seal forms a sealing engagement with a radially inner surface of the socket.

* * * * *